(12) United States Patent
Kwon

(10) Patent No.: US 10,029,646 B2
(45) Date of Patent: Jul. 24, 2018

(54) AIRBAG APPARATUS FOR REDUCING INJURY

(71) Applicant: HYUNDAI MOBIS CO., LTD., Seoul (KR)

(72) Inventor: Hae Wook Kwon, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 15/597,786

(22) Filed: May 17, 2017

(65) Prior Publication Data

US 2017/0349134 A1 Dec. 7, 2017

(30) Foreign Application Priority Data

Jun. 1, 2016 (KR) .................. 10-2016-0068309

(51) Int. Cl.
| | |
|---|---|
| *B60R 21/16* | (2006.01) |
| *B60R 21/239* | (2006.01) |
| *B60R 21/20* | (2011.01) |
| *B60R 21/2338* | (2011.01) |
| *B60R 21/215* | (2011.01) |

(52) U.S. Cl.
CPC ............ *B60R 21/239* (2013.01); *B60R 21/20* (2013.01); *B60R 21/215* (2013.01); *B60R 21/2338* (2013.01); *B60R 2021/2395* (2013.01); *B60R 2021/23382* (2013.01)

(58) Field of Classification Search
CPC ..... B60R 21/239; B60R 21/20; B60R 21/215; B60R 21/2338; B60R 2021/23382; B60R 2021/2395
USPC ............................................ 280/743.1, 743.2
See application file for complete search history.

(56) References Cited

U.S. PATENT DOCUMENTS

| | | | | |
|---|---|---|---|---|
| 5,931,497 A * | 8/1999 | Fischer | ............... | B60R 21/2338 280/735 |
| 7,497,469 B2 * | 3/2009 | Fischer | ................. | B60R 21/233 280/743.2 |
| 8,322,748 B2 * | 12/2012 | Abe | ..................... | B60R 21/2338 280/730.2 |
| 2007/0108750 A1 * | 5/2007 | Bauer | .................... | B60R 21/233 280/740 |
| 2007/0132222 A1 * | 6/2007 | Thomas | ................ | B60R 21/231 280/743.2 |
| 2008/0073891 A1 * | 3/2008 | Rose | .................... | B60R 21/2338 280/739 |
| 2009/0224519 A1 * | 9/2009 | Fukawatase | .......... | B60R 21/233 280/736 |
| 2011/0121549 A1 * | 5/2011 | Parks | .................. | B60R 21/2346 280/741 |
| 2011/0254256 A1 * | 10/2011 | Mendez | ............. | B60R 21/2338 280/743.2 |

(Continued)

*Primary Examiner* — Toan To
(74) *Attorney, Agent, or Firm* — Knobbe Martens Olson & Bear LLP

(57) ABSTRACT

An airbag apparatus for reducing an injury may include: an airbag cushion part having a vent hole part through which gas is discharged; a cover member having a communication hole part smaller than the vent hole part, and adjusting the amount of gas discharged through the vent hole part by selectively covering the vent hole part; and a vent tether connected to the airbag cushion part and the cover member, and pulling the cover member in connection with an expansion of the airbag cushion part.

10 Claims, 7 Drawing Sheets

(56) References Cited

U.S. PATENT DOCUMENTS

| | | | |
|---|---|---|---|
| 2012/0306187 A1* | 12/2012 | Mendez | B60R 21/2338 280/743.2 |
| 2013/0147171 A1* | 6/2013 | Shin | B60R 21/2338 280/743.2 |
| 2015/0283973 A1* | 10/2015 | Jang | B60R 21/239 280/743.2 |

* cited by examiner

AIRBAG APPARATUS FOR REDUCING INJURY

CROSS-REFERENCES TO RELATED APPLICATIONS

The present application claims priority to Korean application number 10-2016-0068309, filed on Jun. 1, 2016, which is incorporated by reference in its entirety.

BACKGROUND OF THE INVENTION

The present invention relates to an airbag apparatus for reducing an injury, and more particularly, to an airbag apparatus capable of reducing the probability that the head and neck of a passenger will be injured when an airbag is deployed.

In general, a vehicle has an airbag installed therein, in order to protect a passenger. The airbag is installed at various positions depending on the body parts of a passenger. A front airbag is installed in the front of the vehicle. When an impact is applied to the vehicle, gas is injected into the front airbag. The front airbag is deployed while expanded by the injected gas, and protects the upper body and head of the passenger.

In the related art, however, the amount of gas injected to the airbag may be increased more than necessary. In this case, the inner pressure of the airbag may be increased more than necessary. When the inner pressure of the airbag is increased more than necessary, the head or neck of a passenger may be injured while the collision acceleration of the head of the passenger is relatively increased. Therefore, there is a demand for a structure capable of solving the problem.

The related art is disclosed in Korean Patent Publication No. 2014-0047431 published on Apr. 22, 2014 and entitled "Passenger airbag apparatus".

SUMMARY OF THE INVENTION

Embodiments of the present invention are directed to an airbag apparatus for reducing an injury, which is capable of reducing the probability that the head and neck of a passenger will be injured while an airbag is expanded.

In one embodiment, an airbag apparatus for reducing an injury may include: an airbag cushion part having a vent hole part through which gas is discharged; a cover member having a communication hole part smaller than the vent hole part, and adjusting the amount of gas discharged through the vent hole part by selectively covering the vent hole part; and a vent tether connected to the airbag cushion part and the cover member, and pulling the cover member in connection with an expansion of the airbag cushion part.

The airbag cushion part may include: a pair of cushion sides each having the vent hole part; and a cushion body positioned between the cushion sides, connected to the cushion sides, and expanded toward a passenger.

The cover member may be connected to the inner surface of the cushion side at the circumference of the vent hole part.

The cover member may be disposed on the cushion side such that the communication hole part overlaps the vent hole part.

One side of the vent tether may be connected to the cover member, and the other side of the vent tether may be connected to the cushion body which is expanded toward the passenger.

When the airbag cushion part is expanded, tension to pull the cover member may be provided to the vent tether such that the cover member is separated from the cushion side.

When the volume of the airbag cushion part is reduced after the expansion of the airbag cushion part, the cover member may be moved to the cushion side with the decrease in tension of the vent tether.

The cover member may cover the vent hole part while being in contact with the cushion side.

The cover member may be formed of the same material as the airbag cushion part.

The airbag apparatus may further include a cushion housing installed in the front of a vehicle body so as to face a passenger, such that the airbag cushion part is expanded toward the passenger, and having the airbag cushion part embedded therein.

The airbag apparatus may further include an internal tether disposed in the airbag cushion part and limiting an expansion of the airbag cushion part.

The internal tether may be formed of a flexible material.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
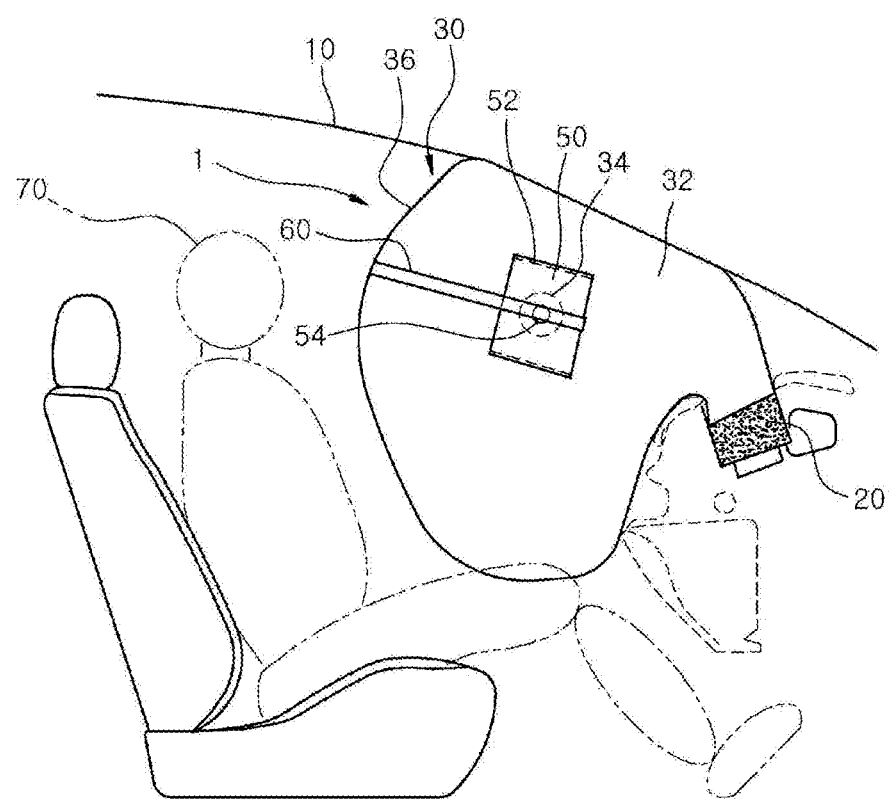
FIG. 1 is a diagram illustrating the state in which an airbag apparatus for reducing an injury in accordance with an embodiment of the present invention is installed in the front of a vehicle body.
Figure 2:
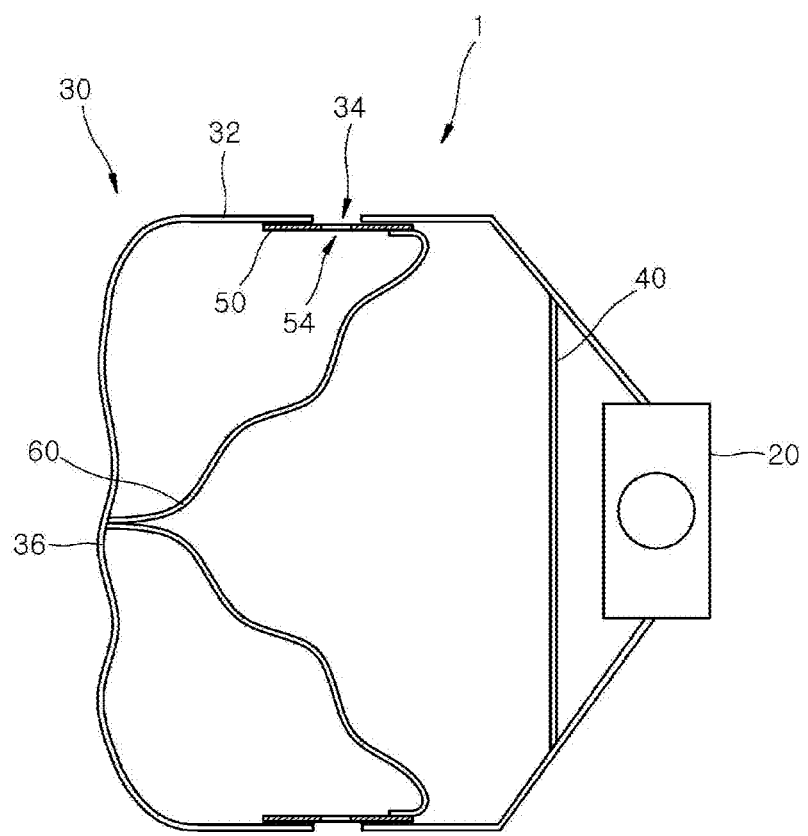
FIG. 2 is a cross-sectional view illustrating the initial state in which the airbag apparatus for reducing an injury in accordance with the embodiment of the present invention is deployed.
Figure 3:
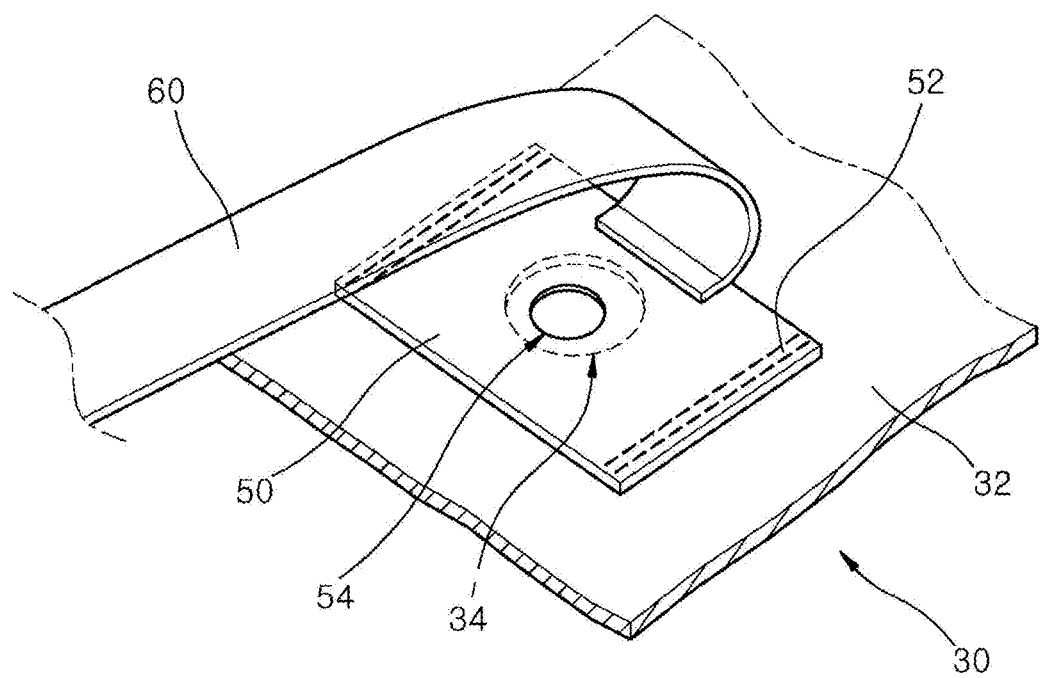
FIG. 3 is a perspective view of a cover member installed at the inside of a vent hole part in the airbag apparatus for reducing an injury in accordance with the embodiment of the present invention.
Figure 4:
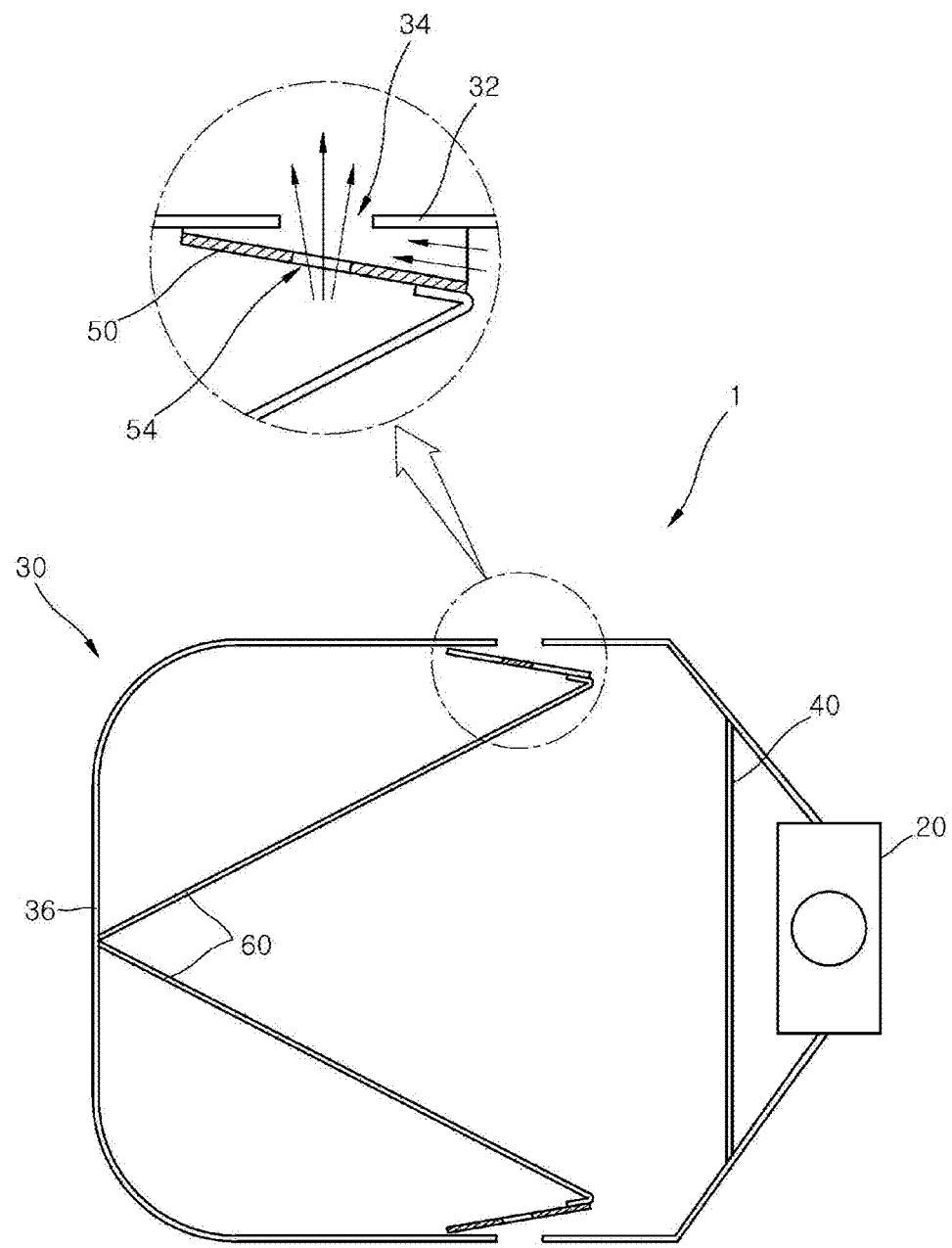
FIG. 4 is a cross-sectional view illustrating the state in which tension is formed in a vent tether and pulls the cover member while the airbag apparatus for reducing an injury in accordance with the embodiment of the present invention is deployed.
Figure 5:
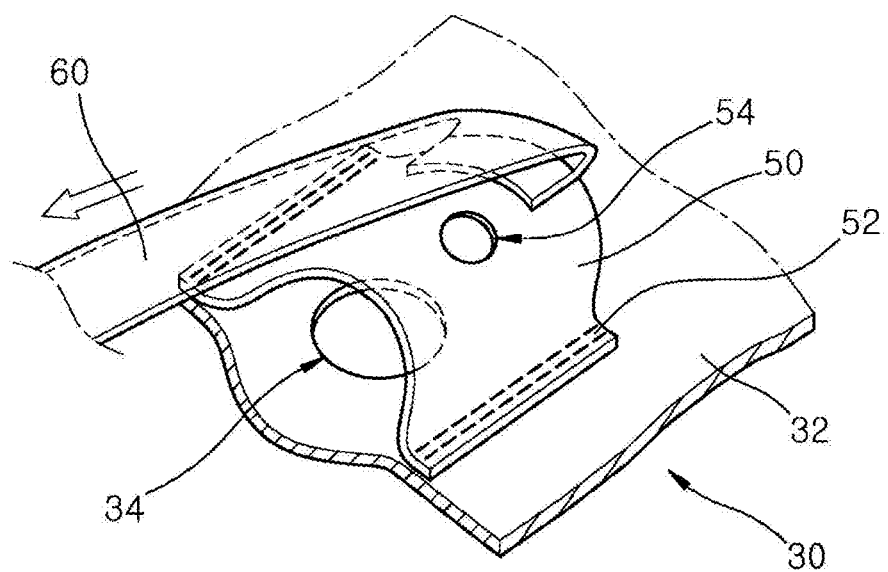
FIG. 5 is a perspective view illustrating a state in which the cover member in accordance with the embodiment of the present invention is separated from the vent hole part.
Figure 6:
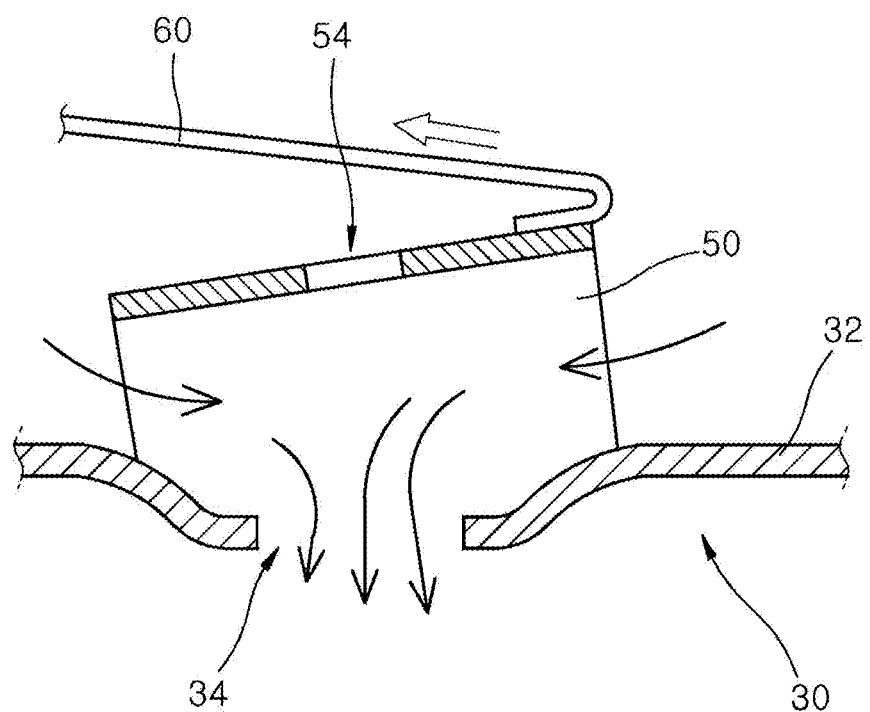
FIG. 6 is a cross-sectional view illustrating the state in which the cover member in accordance with the embodiment of the present invention is separated from the vent hole part.
Figure 7:
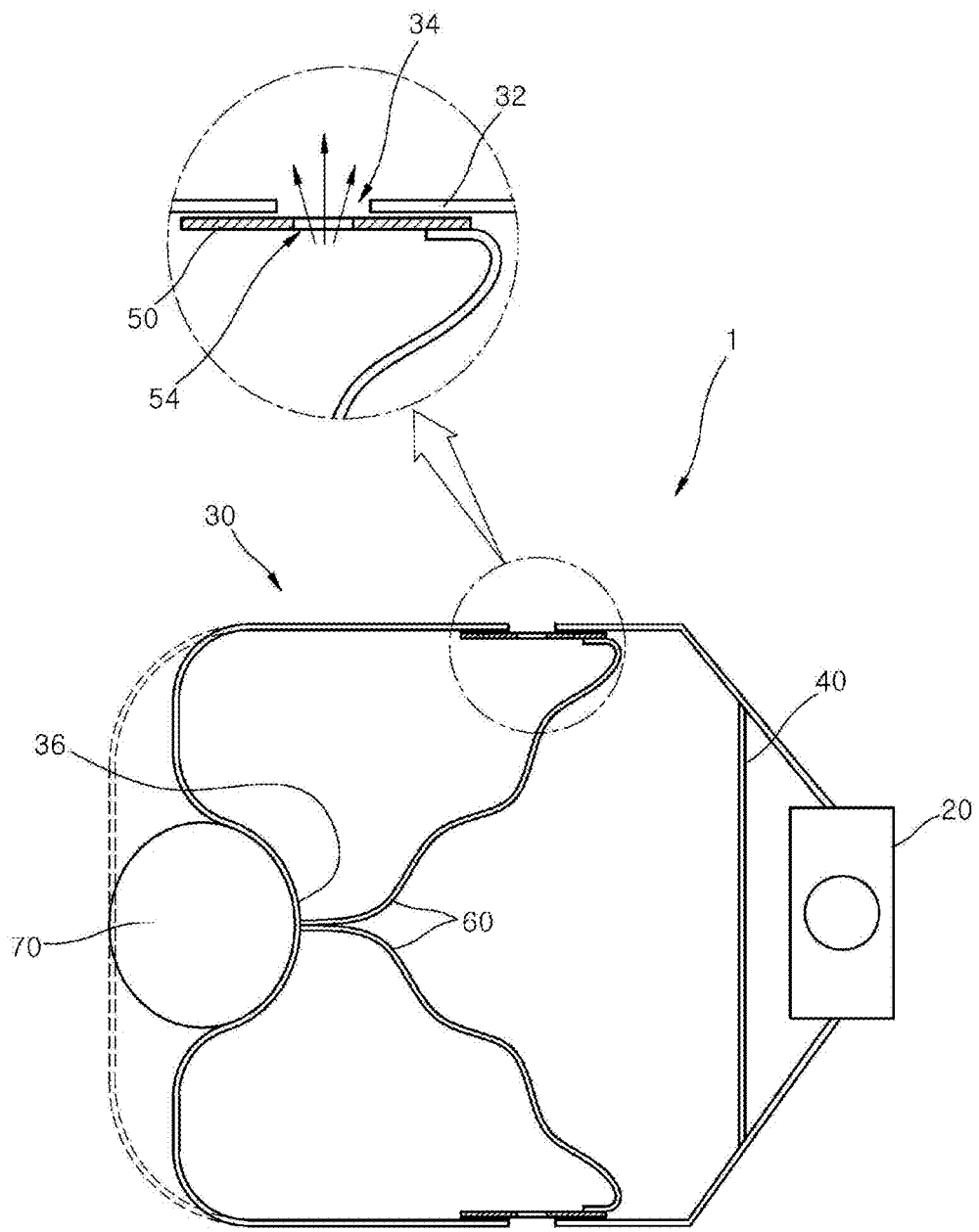
FIG. 7 is a cross-sectional view illustrating the state in which a passenger collides with an airbag cushion part in the airbag apparatus for reducing an injury in accordance with the embodiment of the present invention.

FIG. 1 is a diagram illustrating the state in which an airbag apparatus for reducing an injury in accordance with an embodiment of the present invention is installed in the front of a vehicle body, FIG. 2 is a cross-sectional view illustrating the initial state in which the airbag apparatus for reducing an injury in accordance with the embodiment of the present invention is deployed, FIG. 3 is a perspective view of a cover member installed at the inside of a vent hole part in the airbag apparatus for reducing an injury in accordance with the embodiment of the present invention, FIG. 4 is a cross-sectional view illustrating the state in which tension is formed in a vent tether and pulls the cover member while the airbag apparatus for reducing an injury in accordance with the embodiment of the present invention is deployed, FIG. 5 is a perspective view illustrating a state in which the cover member in accordance with the embodiment of the present invention is separated from the vent hole part, FIG. 6 is a cross-sectional view illustrating the state in which the cover member in accordance with the embodiment of the present invention is separated from the vent hole part, and FIG. 7 is a cross-sectional view illustrating the state in which a passenger collides with an airbag cushion part in the airbag apparatus for reducing an injury in accordance with the embodiment of the present invention.

As illustrated in FIGS. 1 and 2, an airbag apparatus 1 for reducing an injury in accordance with an embodiment of the present invention may include a cushion housing 20, an airbag cushion part 30, an internal tether 40, a cover member 50 and a vent tether 60.

The cushion housing 20 may be installed in the front of a vehicle body 10. In the cushion housing 20, the airbag cushion part 30, the cover member 50, the internal tether 40 and the vent tether 60 are folded and stored. When an accident occurs, the airbag cushion part 30 of the cushion housing 20 may be deployed to reduce an injury of a passenger 70 sitting on a passenger seat.

The airbag cushion part 30 may be formed in various shapes as long as a vent hole part 34 can discharge gas. The airbag cushion part 30 is connected to an inflator (not illustrated) for spraying gas. The airbag cushion part 30 may be disposed at the front side of the vehicle body 10 so as to protect the upper body and head of the passenger 70 sitting on the front seat.

The airbag cushion part 30 may have a vent hole part 34 for discharging internal gas to the outside. The airbag cushion part 30 may include one or more vent hole parts 34. The internal tether 40 may be installed in the airbag cushion part 30, in order to limit the expansion shape or expansion range of the airbag cushion part 30. The internal tether 40 may be installed in the airbag cushion part 30 along the horizontal direction of the airbag cushion part 30, and guide an expansion of the airbag cushion part 30. The internal tether 40 may be formed of a flexible material, and both sides of the internal tether 40 may be connected to the inside of the airbag cushion part 30.

The airbag cushion part 30 in accordance with the embodiment of the present invention may include a pair of cushion sides 32 each having the vent hole part 34 and a cushion body 36 positioned between the cushion sides 32 and expanded toward the passenger 70. The cushion sides 32 may form both sides of the airbag cushion part 30, and the cushion body 36 may connect the cushion sides 32 and reduce an injury of the passenger 70 while coming in contact with the passenger 70.

The cover member 50 may selectively cover the vent hole part 34, and adjust the amount of gas discharged through the vent hole part 34. The cover member 50 may include a communication hole part 54 which forms a smaller hole than the vent hole part 34 and communicates with the vent hole part 34. The cover member 50 may be connected to the inner surface of the airbag cushion part 30 at the circumference of the vent hole part 34.

The communication hole part 54 may have a smaller size than the vent hole part 34. The communication hole part 54 may serve as a path for discharging gas from the airbag cushion part 30. The vent hole part 34 forming a larger hole than the communication hole part 54 may serve as a path for discharging a larger amount of gas from the airbag cushion part 30, when the cover member 50 is separated from the airbag cushion part 30.

The cover member 50 may be formed of the same material as the airbag cushion part 30. Since the cover member 50 covers the vent hole part 34, the amount of gas discharged through the vent hole part 34 can be reduced at the initial stage while the airbag cushion part 30 is expanded and deployed.

The cover member 50 may be connected to the inner surface at the circumference of the vent hole part 34, and the vent tether 60 may be disposed in the airbag cushion part 30. Therefore, when the airbag cushion part 30 is expanded, the cover member 50 may be pulled into the airbag cushion part 30 by the vent tether 60, and the cover member 50 may be separated from the vent hole part 34. Therefore, since the gas in the airbag cushion part 30 is discharged through the vent hole part 34 having a larger hole than the communication hole part 54, the airbag apparatus can reduce an injury of the passenger 70, which may be caused by a rapid expansion of the airbag cushion part 30.

Furthermore, since the cover member 50 is opened by the tension of the vent tether 60, the cover member 50 may open the vent hole part 34 even though a separate opening/closing device is not applied.

The cover member 50 may be connected to the circumference of the vent hole part 34. Since the cover member 50 is connected to the circumference of the vent hole part 34 by a sewed part 52, the cover member 50 may be easily connected to the airbag cushion part 30.

The sewed part 52 may be formed at a part of the circumference of the vent hole part 34. For example, the sewed part 52 may be formed at the top and bottom sides of the vent hole part 34. Furthermore, the sewed part 52 may be formed in various shapes, for example, formed at a part of the circumference of the vent hole part 34.

Since the sewed part 52 is formed at a part of the circumference of the vent hole part 34, gas may be discharged through the other part of the circumference of the vent hole part 34, where the sewed part 52 is not formed. Furthermore, the cover member 50 may be fixed to the airbag cushion part 30 by the sewed part 52. Thus, when the tension of the vent tether 60 is released from the cover member 50, the cover member 50 may be placed against the inner surface of the airbag cushion part 30.

The cover member 50 in accordance with the present embodiment may include the communication hole part 54 which communicates with the vent hole part 34 and has a smaller size than the vent hole part 34. Therefore, regardless of whether the cover member 50 opens/closes the vent hole part 34, the gas in the airbag cushion part 30 can be discharged to the outside through the communication hole part 54 and the vent hole part 34. At this time, the airbag cushion part 30 may not be completely expanded, but the inner pressure of the airbag cushion part 30 may be adjusted to such an extent that the passenger 70 can move to the inside of the airbag cushion part 30.

Therefore, when the head of the passenger 70 collides with the airbag cushion part 30 in case of a collision of the vehicle, a buffer time from a point of time that the head comes in contact with the airbag cushion part 30 to a point of time that an reaction force of the airbag cushion part 30 is applied to the head can be extended. Furthermore, since the collision acceleration of the head is reduced by the buffering operation of the airbag cushion part 30, the airbag apparatus can reduce the probability that the head or neck will be injured.

In the airbag apparatus 1 for reducing an injury in accordance with the present embodiment, the vent hole part 34 may be formed at each of the cushion sides 32 installed at both sides of the airbag cushion part 30, and the cover member 50 may be installed at the inside of the vent hole part 34. The cover member 50 and the inside of the cushion body 36 deployed toward the passenger 70 may be connected by the vent tether 60. The vent tether 60 may be installed in a V-shape in the airbag cushion part 30.

The vent tether 60 may be connected to the airbag cushion part 30 and the cover member 50, and open the vent hole part 34 while pulling the cover member 50 in connect with an expansion of the airbag cushion part 30. The vent tether 60 may be disposed in the airbag cushion part 30. When the airbag cushion part 30 is expanded to a preset size or more, tension may be applied to the vent tether 60 so as to pull the cover member 50 in a direction away from the cushion side 32.

One side of the vent tether 60 may be connected to the cover member 50, and the other side of the vent tether 60 may be connected to the inside of the cushion body 36 which is expanded in a shape facing the passenger 70. When the cushion body 36 is expanded to the maximum volume, the distance between the cushion body 36 and the cover member 50 may be larger than the length of the unfolded vent tether 60. Therefore, since the vent tether 60 pulls the cover member 50 before the cushion body 36 is expanded to the maximum volume, a larger amount of gas may be discharged through the vent hole part 34.

The vent tether 60 may form tension to pull the cover member 50 in connection with the expansion of the airbag cushion part 30, and the cover member 50 may be separated from the vent hole part 34 by the tension of the vent tether 60.

After the passenger 70 collides the airbag cushion part 30, the volume of the airbag cushion part 30 may be decreased to reduce the tension of the vent tether 60, such that the cover member 50 blocks the vent hole part 34. Therefore, the gas in the airbag cushion part 30 may be discharged as much as the amount of gas discharged through the communication hole part 54 of the cover member 50.

The vent tether 60 may be connected to the cover member 50. When the airbag cushion part 30 is expanded, the vent tether 60 may pull the cover member 50 to open the vent hole part 34. The vent tether 60 may be manufactured by weaving fabric or stacking fabric in synthetic resin. Since the vent tether 60 opens the vent hole part 34 when the airbag cushion part 30 is expanded, the inner pressure of the airbag cushion part 30 may be relatively lowered. At this time, the airbag cushion part 30 may not be completely expanded, but expanded to such an extent that the surface thereof can slightly move.

The vent tether 60 may be connected to a part of the circumference of the cover member 50, where the sewed part 52 is not disposed. Therefore, when the vent tether 60 pulls the not-sewed part of the cover member 50 while the airbag cushion part 30 is expanded, the not-sewed part of the cover member 50 may be separated from the inner surface of the airbag cushion part 30, thereby opening the vent hole part 34. Furthermore, since the cover member 50 is fixed to the airbag cushion part 30 by the sewed part 52, the cover member 50 may block the vent hole part 34 when the tension of the vent tether 60 is released from the cover member 50.

Hereafter, the operation of the airbag apparatus 1 for reducing an injury in accordance with the embodiment of the present invention will be described in detail with reference to the accompanying drawings.

The airbag apparatus 1 for reducing an injury in accordance with the embodiment of the present invention may maintain the inner pressure by minimizing the airbag vent at a point of time that the probability of injury of a passenger's neck increases, after the airbag is completely deployed.

As illustrated in FIGS. 2 and 3, gas may be supplied to the airbag cushion part 30 expanded to the outside of the cushion housing 20 through the inflator. As the gas is injected to the airbag cushion part 30, the airbag cushion part 30 may be expanded and deployed.

Before tension is applied to the vent tether 60 from the initial stage at which the airbag cushion part 30 is deployed, the vent tether 60 may apply no tension to the cover member 50. Therefore, the cover member 50 and the cushion sides 32 may be placed against each other. Therefore, only a part of the gas supplied into the airbag cushion part 30 may be discharged to the outside of the airbag cushion part 30 through the communication hole part 54 and the vent hole part 34. Since the communication hole part 54 has a smaller size than the vent hole part 34, only a relatively small amount of gas may be discharged to the outside of the airbag cushion part 30, and induce an early deployment of the airbag cushion part 30.

As illustrated in FIGS. 4 to 6, the vent tether 60 may receive tension with the deployment of the airbag cushion part 30, and then pull the cover member 50. Therefore, the cover member 50 may be separated from the vent hole part 34. After the vent tether 60 receives tension, gas may be discharged through the vent hole part 34 until the passenger 70 collides with the airbag cushion part 30.

When the airbag cushion part 30 is expanded, the tension of the vent tether 60 may pull the cover member 50 to open the vent hole part 34 of the airbag cushion part 30. At this time, when the airbag cushion part 30 is expanded to such an extent that the vent tether 60 is unfolded in a straight line shape, a part of the cover member 50, where the sewed part 52 is not formed, may be pulled by the tension of the vent tether 60. Since the cover member 50 is separated from the inner surface of the airbag cushion part 30, the gas in the airbag cushion part 30 may be discharged to the outside through the vent hole part 34. At this time, the airbag cushion part 30 may not be completely expanded, but expanded to such an extent that the surface thereof can slightly move.

Since a larger amount of gas than the amount of gas discharged through the communication hole part 54 of the cover member 50 is discharged to the outside of the airbag cushion part 30, the inner pressure of the airbag cushion part 30 can be decreased to reduce an injury of the head of the passenger 70.

Therefore, when the head of the passenger 70 collides with the airbag cushion part 30 in case of a collision of the vehicle, a buffer time from a point of time that the head comes in contact with the airbag cushion part 30 to a point of time that an reaction force of the airbag cushion part 30 is applied to the head can be extended. Since the point of time that the reaction force of the airbag cushion part 30 is applied to the head after the collision of the vehicle is delayed, an impact applied to the head can be buffered from the point of time that the head comes in contact with the airbag cushion part 30 to the point of time that the reaction force is applied. Furthermore, since the collision acceleration of the head is reduced by the buffering operation of the airbag cushion part 30, the airbag apparatus can reduce the probability that the head will be injured.

As illustrated in FIG. 7, the impact caused by the collision may be buffered while the passenger 70 comes in contact with the airbag cushion part 30, and the volume of the airbag cushion part 30 may be reduced. Therefore, while the tension of the vent tether 60 connecting the cushion body 36 and the cover member 50 is decreased, the tension applied to the cover member 50 may be released. As the cover member 50 returns to the original state, the cover member 50 may block the vent hole part 34. Therefore, since the gas is discharged through the communication hole part 54 of the cover member 50, the inner pressure of the airbag cushion part 30 may be maintained, which makes it possible to reduce the probability that the neck of the passenger 70 will be injured at the latter stage of the deployment of the airbag apparatus 1 for reducing an injury.

That is, since the reaction force of the airbag cushion part 30, applied to the head, is reduced, the impact load transmitted to the neck through the head can be reduced. Therefore, with the reduction of the impact load transmitted to the neck, the probability that the neck will be injured can be reduced.

In accordance with the present embodiment, since the vent tether 60 pulls the cover member at a point of time that an expansion of the airbag cushion part 30 is completely, the vent hole part 34 may be opened to lower the inner pressure of the airbag cushion part 30, thereby reducing an impact applied to the neck and head of the passenger 70.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An airbag apparatus, comprising:
    an airbag cushion comprising a pair of cushion sides, each cushion side having a vent hole configured to discharge gas;
    a cover member having a communication hole smaller than the vent hole, and configured to adjust an amount of gas discharged through the vent hole by selectively covering the vent hole; and
    a vent tether connected to the airbag cushion and the cover member, and configured to pull the cover member in connection with an expansion of the airbag cushion,
    wherein the airbag cushion further comprises a cushion body positioned between the pair of cushion sides, connected to the pair of cushion sides, and configured to expand toward a passenger,
    wherein for each of the pair of cushion sides, the cover member is connected to an inner surface of individual cushion side at a circumference of the vent hole.

2. The airbag apparatus of claim 1, wherein the cover member is disposed such that the communication hole overlaps the vent hole.

3. The airbag apparatus of claim 2, wherein one side of the vent tether is connected to the cover member, and the other side of the vent tether is connected to the cushion body which is expanded toward the passenger.

4. The airbag apparatus of claim 3, wherein when the airbag cushion is expanded, tension to pull the cover member is provided to the vent tether such that the cover member is separated from the cushion side.

5. The airbag apparatus of claim 4, wherein when the volume of the airbag cushion is reduced after the expansion of the airbag cushion, the cover member is moved to the cushion side with the decrease in tension of the vent tether.

6. The airbag apparatus of claim 5, wherein the cover member covers the vent hole while being in contact with the cushion side.

7. The airbag apparatus of claim 6, wherein the cover member is formed of the same material as the air bag cushion.

8. The airbag apparatus of claim 1, further comprising a cushion housing installed in the front of a vehicle body so as to face a passenger, such that the airbag cushion is configured to expand toward the passenger.

9. The airbag apparatus of claim 1 further comprising an internal tether disposed in the airbag cushion and limiting an expansion of the airbag cushion.

10. The airbag apparatus of claim 9, wherein the internal tether is formed of a flexible material.

* * * * *